United States Patent Office 3,520,860
Patented July 21, 1970

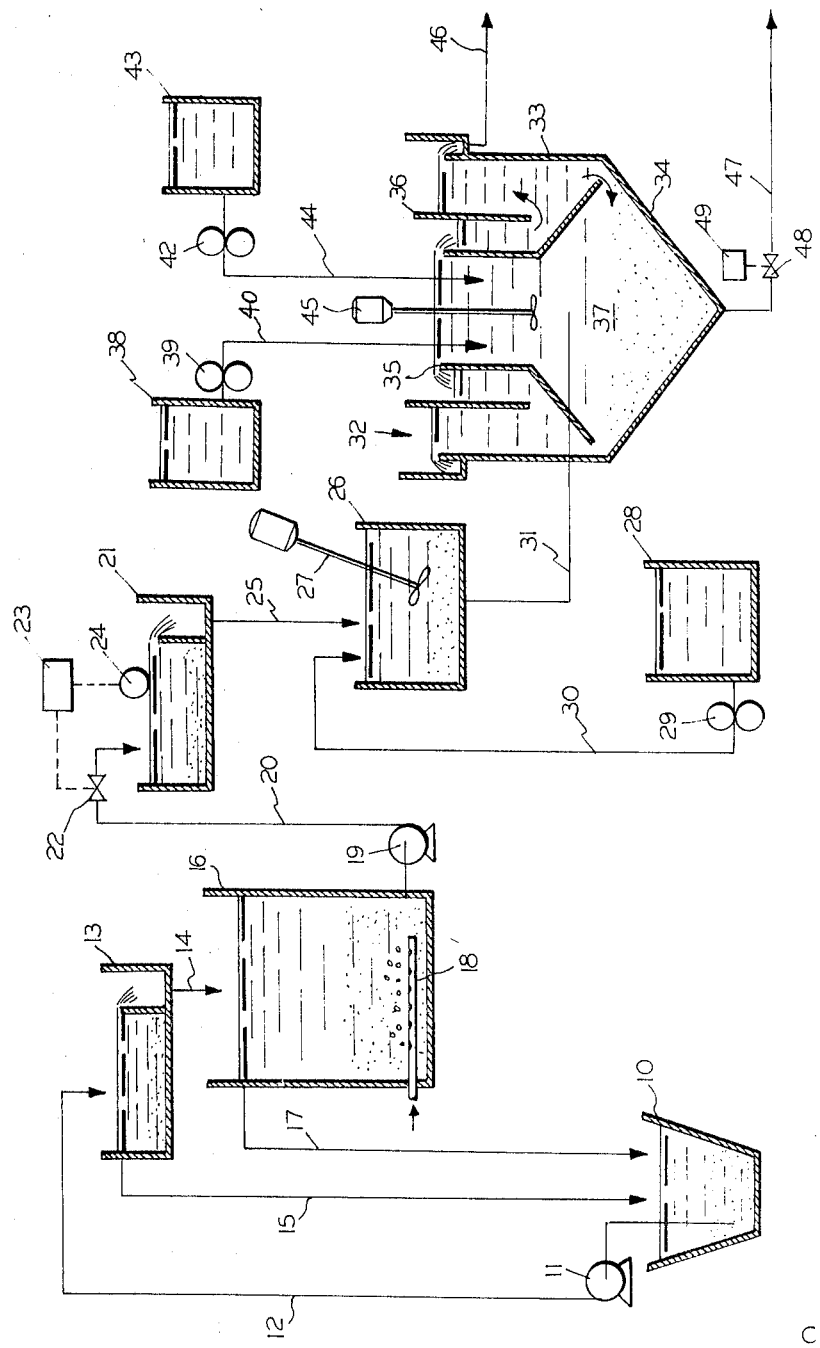

3,520,860
PROCESS FOR CLARIFYING DILUTE LATICES
Charles K. Bon, Midland, Mich., assignor to The Dow Chemical Company, Midland, Mich., a corporation of Delaware
Filed Oct. 5, 1967, Ser. No. 673,135
Int. Cl. C08c 1/08, 1/14, 11/14
U.S. Cl. 260—821                                    7 Claims

ABSTRACT OF THE DISCLOSURE

A process for the concentration of polymer particles in a dilute latex and clarifying the latex comprising in sequence the steps of:

(A) distributing ferric ions preferably as ferric chloride uniformly throughout the dilute latex which is maintained at a pH sufficiently acidic to maintain solubility of the ferric ions, and then (B) adding a base such as sodium hydroxide to the mixture to raise the pH above 7 and then (C) collecting the polymer particles which settle out.

---

Dilute latices containing a small amount of polymers such as rubber are frequently produced during manufacturing operations. These dilute latices, which generally contain less than one weight percent of polymer are milky in appearance. Because of their milky appearance and because of state and municipal waste disposal regulations these dilute latices cannot be discharged directly into streams or rivers without first reducing their polymer content to a level below that at which the latices are no longer milky. In other words these dilute latices must be clarified. Additionally it is sometimes desirable to recover the polymer from the dilute latices for reuse. Many processes have been suggested for the clarification of dilute latices and the recovery of their polymer content, however, these processes suffer from a number of disadvantages. Many do not reduce the polymer content to an acceptably low level, generally considered to be less than 20 parts per million by weight (p.p.m.). Furthermore some of these processes are prohibitively expensive principally due to the amount of the rather expensive coagulant, frequently ferric chloride, employed. Other processes perform satisfactorily with dilute latices whose temperature, polymer concentration, and feed rate vary only slightly one from the other but do not perform satisfactorily when greater variations occur.

It is therefore an object of the present invention to provide a novel process for the coagulation and clarification of dilute latices and the recovery of polymer which is free of the disadvantages of the prior art.

Another object of the present invention is to provide a novel process for separating colloidally dispersed polymer particles from the aqueous phase of dilute latices.

A further object of the present invention is to provide a novel process for the clarification of dilute latices which is especially economical by reason of the small amount of coagulant necessary.

A still further object of the present invention is to provide a novel process for clarifying dilute latices having widely varying temperature, concentration, and feed rate.

Additional object and advantages will be apparent to those skilled in the art by reference to the following detailed description thereof.

The above and other objects are accomplished according to the present invention by a process comprising in sequence the steps of:

(A) distributing ferric ions uniformly throughout the dilute latex which is maintained at a pH sufficiently acidic to maintain solubility of the ferric ions, and then (B) adding a base to the mixture to raise the pH above 7 and then (C) collecting the polymer particles which settle out.

An important feature of the present invention is the adding of the ferric ions before the increasing of the pH. Furthermore in order to obtain optimum benefits it is necessary to operate within the critical pH ranges and concentrations specified herein.

The invention may be better understood by referring to the single figure of the drawing which is a diagrammatic flow sheet representing a preferred embodiment of the invention and showing in sectional elevation certain apparatus useful in practicing the process of the present invention. Referring to the drawing there is shown a tank or flume 10 containing the dilute latex. A pump 11 withdraws the dilute latex from the flume 10 and discharges it through line 12 into a first weir box 13. An even flow rate is maintained from weir box 13 through line 14 by reason of line 15 which is attached to weir box 13 as an overflow returning excess dilute latex to the flume 10. The weir box 13 discharges through line 14 into leveling tank 16 the purpose and function of which is more completely described below. The leveling tank 16 is provided with an overflow line 17 and means for agitation which may take the form of a pipe 18 containing holes and provided with a source of compressed air not shown. A pump 19 withdraws the dilute latex from the leveling tank 16 and discharges it through line 20 into weir box 21. The flow through line 20 is automatically adjusted by valve 22 which is controlled by flow controller 23 in response to the level of the dilute latex in weir box 21 as measured for example by float 24. Weir box 21 discharges through line 25 into mix tank 26 which is provided with an agitator 27. Ferric ions are added to the mix tank 26 from tank 28 by means of pump 29 which can be a positive displacement metering pump and which discharges through line 30 into mix tank 26. The agitator 27 agitates the contents of the tank and ensures uniform distribution of the ferric ions throughout the latex. Mix tank 26 discharges through line 31 into a settler 32 at a rate substantially equal to the rate of feed through lines 25 and 30.

Although any type of gravity settler is satisfactory the preferred form is that known as an "Accelator" available from the Infilco Company. The construction and operation of settlers is well-known and is described for example in Alexander, Colloid Chemistry, vol. VI, Reinhold Publishing Corp., N.Y., 1946 pp. 782–799, and in Perry's Chemical Engineering Handbook, 4th Ed. pp. 21–17 to 21–23. In general the preferred settler 32 comprises an outer tank 33 having a sloping bottom 34 and provided with a first stationary baffle 35 and a second stationary baffle 36, both having the configuration shown. Line 31 feeds the dilute latex to the center compartment 37 of the settler 32.

A base from tank 38 is metered by pump 39 which discharges into settler 32 via line 40. In a preferred embodiment of the present invention starch is also added to the settler 32. The starch can be metered to the settler 32 by metering pump 42 drawing the starch from tank 43 and discharging it to the settler 32 through line 44. The settler 32 is also provided with an agitator 45. The clarified effluent containing less than 20 p.p.m. polymer is removed from the settler 32 via line 46 and the slurry containing the balance of the polymer is removed from the settler 32 via line 47. The rate of flow of the slurry through line 47 is adjusted by valve 48 operated by controller 49 which can be a timer or any other well-known automatic control device. The balance of the slurry from line 47 is treated by any conventional concentration apparatus, not shown, in order to remove and reclaim or discard the rubber.

The leveling tank 16 can be of any convenient design but should have a capacity of at least 6 and preferably 8 to 10 times the hourly rate of dilute latex. For example, when handling 1000 gallons per hour of dilute latex a leveling tank 16 having a capacity of at least 6000 gallons is employed. The function of the leveling tank is to smooth out variations in concentration, temperature, and flow rate of the dilute latex. Variations in these cause operating difficulties. For example, temperature variations in the dilute latex causes thermal gradients in the settler 32. These thermal gradients inhibit settling of the polymer which causes the concentration of the polymer in the effluent to increase above the desired level. Variations in the concentration make process control difficult since the amount of ferric ion added is directly proportional to the concentration of the polymer in the dilute latex.

As previously stated the ferric ion must be added to the dilute latex prior to gravity separation. When the ferric ion is added as ferric chloride it is present in the dilute latex in an amount equal to 0.075 to 1.03 and preferably 0.10 to 0.30 lb. of ferric chloride per lb. of polymer in the latex. The pH of the ferric ion containing latex must be sufficiently acidic to maintain solubility of the ferric ions and is preferably between 2 and 6 and ideally between 3.0 and 4.5. In neutral latices the addition of the ferric chloride generally gives the mixture the desired pH, however, for alkaline latices an amount of an acid such as hydrochloric acid can be added to adjust the pH. The ferric ions which are used as coagulants in the process of the present invention can be added in the form of their water soluble salts and preferably those of strong acids, examples of which include among others ferric sulfate, ferric-ammonium sulfate, and ferric nitrate, or as ferrous salts capable of being oxidized in situ to ferric salts. The preferred salt is ferric chloride.

The bases useful in the present invention are those which can be used to raise the pH of the dilute latex and are preferably alkali metal hydroxides such as potassium hydroxide and most preferably sodium hydroxide. Other bases such as lime can be employed but are less preferred. Although the settler 32 will operate satisfactorily at pH's from about 6.5 to 10 a pH of 7 to 8 is preferred. At pH's below 7 the settling rate of the polymer decreases and at pH's above 8 the amount of base becomes expensive without producing any corresponding benefit.

In one preferred embodiment of the present invention starch is added to the settler 32 such that the weight ratio of starch to ferric chloride is between 2.6:100 and 40:100. The starch increases the settling rate of the polymer and permits operation at high flow rates. Starch from any source such as wheat, rice, potatoes, tapioca, or most preferably corn can be employed. Certain other anionic organic polyelectrolytes such as polyacrylamide can be used in place of or in addition to starch.

In a preferred embodiment of the present invention the concentration of polymer in the center compartment 37 of the settler 32 is maintained between 0.5 and 2.0 and preferably between 0.6 and 1.6 weight percent polymer based on the weight of the latex. This aids in settling and is most conveniently accomplished by adjusting the rate of removal of the slurry through valve 48. If the polymer concentration in the center compartment 37 is too low settling does not occur rapidly enough and concentration of polymer in the effluent increases.

The dilute latices which can be clarified according to the present invention are generally those having from 30 p.p.m. up to and greater than one weight percent of polymer such as those produced from polystyrene, polyvinylchloride, polyvinylidene chloride the polyacrylate resins and copolymers of styrene and butadiene. Some of these can be classed as synthetic rubber. The polymer can also be natural rubber. The particles of polymer in the latex vary in size from a few angstroms up to and through the colloidal size range.

The invention may be better understood by reference to the following examples in which all parts and percentages are by weight unless otherwise indicated. These examples are illustrative of certain embodiments designed to teach those skilled in the art how to practice the invention and to represent the best mode contemplated for carrying out the invention and are not intended to limit the scope of the invention in any manner.

EXAMPLE 1

This example illustrates the present invention by means of readings taken on the apparatus shown in the drawing on different days of one month of operation. These readings are recorded in various columns of Table I. The feed rate and weight percent of polymer in the dilute latex in line 31 was measured and recorded in columns 2 and 3 respectively. The polymer in the dilute latex was a mixture of various styrene butadiene polymers. The weight percent of polymer in the effluent from line 46 of the settler 32 was measured and recorded in column 4. The ferric chloride feed rate to the mix tank 26 was recorded in column 5 and the starch and sodium hydroxide feed rates to the settler 32 were recorded respectively in columns 6 and 7. The concentration of polymer in the slurry in line 47 and in the center compartment 37 was measured and recorded in columns 8 and 9. The pH in the mix tank 26 and the center compartment 37 of the settler 32 are measured and recorded respectively in columns 10 and 11. The leveling tank 16 was cylindrical and had a diameter of 8 feet and a height of 8 feet. The settler 32 was a Pilot Plant "Accelator" supplied by the Infilco Company having an external diameter of 6.5 feet and a height of 8 feet.

TABLE I

| 1 | 2 | 3 | 4 | 5 | 6 | 7 | 8 | 9 | 10 | 11 |
|---|---|---|---|---|---|---|---|---|---|---|
| Day of the month | Feed rate of latex to settler (gal./min.) | Wt. of polymer in feed to settler (p.p.m.) | Wt. of polymer in settler effluent (p.p.m.) | $FeCl_3$ feed rate (lbs. $FeCl_3$ per 1,000 gal. latex) | Starch feed rate (lbs. starch per 1,000 gal. latex) | NaOH feed rate (lbs. NaOH per 1,000 gal. latex) | Conc. of slurry (g./l.) | Conc. of center compt. (g./l.) | pH in mix tank (pH) | pH in center compartment of settler (pH) |
| 7 | 4.38 | 685 | 10 | 1.88 | 0.32 | 1.79 | 48.6 | | 3.2 | 7.3 |
| 8 | 3.87 | 2,120 | 10 | | .42 | 2.01 | 27.0 | 8.9 | 3.3 | 7.7 |
| 12 | 7.40 | 1,034 | 12 | | .26 | 1.17 | 55.4 | 12.5 | 3.6 | 7.6 |
| 13 | 6.28 | 1,253 | 12 | 1.61 | .28 | 1.47 | 35.4 | 11.3 | 3.8 | 7.8 |
| 14 | 5.26 | 790 | 5 | 1.66 | .36 | 2.11 | 22.3 | 13.0 | 3.2 | 7.8 |
| 15 | 6.34 | 761 | 9 | 1.53 | .27 | 2.31 | 28.2 | 10.3 | 3.9 | 8.0 |
| 16 | 5.95 | | | 1.64 | .28 | 1.90 | | | | |
| 17 | 6.00 | | | 1.59 | .28 | 1.90 | | | | |
| 18 | 6.17 | 729 | 6 | 1.67 | .07 | 0.63 | 23.6 | 8.9 | 4.0 | 8.0 |
| 19 | 5.80 | 1,614 | 11 | 1.72 | .28 | 2.17 | 52.5 | 15.3 | 3.5 | 7.6 |
| 20 | 4.48 | 966 | 4 | 1.97 | .46 | 2.27 | 30.5 | 13.6 | 3.8 | 7.8 |
| 21 | 5.36 | 1,468 | 5 | 1.35 | .31 | 1.89 | 31.1 | 12.6 | 3.4 | 8.0 |
| 22 | 6.48 | | | 1.84 | .25 | 1.58 | | | 4.0 | 7.6 |
| 23 | 6.45 | | | 1.50 | .22 | 1.31 | | | | |
| 24 | 6.00 | | | 1.41 | .22 | 1.31 | | | | |
| 25 | 4.80 | 533 | 8 | 1.66 | .31 | 2.08 | 24.2 | 11.1 | 3.9 | 7.9 |
| 26 | 5.18 | 741 | 6 | 1.80 | .30 | 1.79 | 43.0 | 12.8 | 3.2 | 7.9 |
| 27 | 5.65 | 855 | 7 | 1.65 | .21 | 1.77 | 32.9 | 16.0 | 3.4 | 7.9 |
| 28 | 4.85 | 921 | 13 | 1.51 | .10 | 2.05 | 33.8 | 18.3 | 4.0 | 7.9 |
| Average | 5.62 | 1,033 | 8 | 1.63 | .27 | 1.76 | 34.9 | 12.7 | 3.6 | 7.8 |

EXAMPLE 2

This example illustrates an unsuccessful attempt to use aluminum sulfate as a coagulant.

The procedure of Example 1 was repeated except that the ferric chloride was replaced with an equal weight of aluminum sulfate. Although settling rates and filtration rates were satisfactory the concentration of polymer in the effluent continued to increase and after one week of operation the effluent contained 50 p.p.m. polymer. Attempts to reduce the concentration of polymer in the effluent by increasing the amount of aluminum sulfate and by changing the pH were unsuccessful.

EXAMPLE 3

This example illustrates an attempt to control pH in the settler 32 by means of lime.

The procedure of Example 1 was repeated except that the sodium hydroxide was replaced with a stoichiometrically equivalent amount of lime. Almost twice the amount of alkaline value was required and it was difficult to control the pH above 7. Additionally certain of the dilute latices contained sodium carbonate which acted as a buffer further inhibiting the increase in pH and causing a calcium carbonate shell to form around the lime particles inhibiting dissolution. The use of lime failed to increase the settling rate.

Although the invention has been described in considerable detail with reference to certain preferred embodiments thereof, it will be understood that variations and modifications can be effected within the spirit and scope of the invention as described above and as defined in the appended claims.

What is claimed is:

1. A process for the concentration of polymer particles in a latex containing less than about 1% by weight of a polymer, comprising the sequential steps of:
   (A) distributing ferric ions, in an amount equal to 0.075 to 1.03 pounds, calculated as ferric chloride, per pound of polymer in the latex, uniformly throughout the dilute latex which is maintained at a pH of 2 to 6 and sufficiently acidic to maintain the solubility of ferric ions, and then
   (B) adding a base to the mixture to raise the pH between 7 and 10, and then
   (C) collecting the polymer particles which settle out.

2. The process of claim 1 wherein the ferric ions are added as a solution of ferric chloride.

3. The process of claim 1 wherein the base is sodium hydroxide.

4. The process of claim 1 further comprising the step of adding starch to the dilute latex after the ferric ion has been added wherein the weight ratio of starch to ferric ion, calculated as ferric chloride, is between 2.6:100 and 40:100.

5. The process of claim 4 wherein the ferric ions are added as a solution of ferric chloride.

6. The process of claim 1 for clarifying dilute latices containing from 30 parts per million to one weight percent polymer in aqueous medium by reducing the concentration of polymer to less than 20 parts per million comprising the steps of:

(A) first distributing ferric chloride uniformly throughout the dilute latex in the weight ratio of 1:10 to 1:1 while maintaining the pH of the dilute latex between 2 and 6 sufficiently acidic to maintain solubility of the ferric ions, and then
   (B) adding sodium hydroxide to the dilute latex to raise the pH to between 7 and 10,
   (C) adding corn starch to the dilute latex in the weight ratio of starch to ferric chloride added of between 2.6:100 and 40:100
   (D) concentrating the polymer particles by gravity separation and
   (E) removing the clarified aqueous medium containing less than 20 parts per million polymer.

7. A continuous process according to claim 1 for clarifying dilute polymeric latices of different temperatures containing different concentrations of polymer comprising the steps of:
   (A) continually feeding the dilute latices to a first tank having a capacity of at least 6 times the hourly feed rate of the latex,
   (B) continuously withdrawing the dilute latex from the first tank at a rate substantially equal to the feed rate to the first tank, and discharging the dilute latex to a mix tank,
   (C) continuously adding to the mix tank a solution of ferric chloride at a rate of 0.10 to 0.30 lb. of ferric chloride per lb. of polymer in the latex on an hourly basis while maintaining the pH of the contents of the tank between 3.0 and 4.5,
   (D) continuously removing the dilute latex from the mix tank at a rate substantially equal to the feed rate, and discharging the dilute latex to a gravity settler,
   (E) continuously adding to the gravity settler
      (1) sodium hydroxide in an amount to maintain the pH of the contents of the settler between 7 and 8,
      (2) starch at a rate equal to 0.1 to 0.2 lb. per hour times the hourly rate of addition of ferric chloride,
   (F) continuously removing from the gravity settler:
      (1) effluent containing less than 20 parts per million of polymer,
      (2) slurry containing the balance of the polymer,
   (G) simultaneously maintaining within the settler a concentration of between 0.5 and 2.0 weight percent polymer based on the weight of the latex.

References Cited

UNITED STATES PATENTS

| | | | |
|---|---|---|---|
| 2,604,467 | 7/1952 | Crouch et al. | 260—85.1 |
| 3,024,223 | 3/1962 | Klapper | 260—85.1 |

JOSEPH L. SCHOFER, Primary Examiner

W. F. HAMROCK, Assistant Examiner

U.S. Cl. X.R.

260—822, 29.7, 85.1, 96, 93.5, 92.8, 89.5; 210—52